Nov. 7, 1944.   C. H. BISSELL   2,362,184
FITTING FOR SERVICE ENTRANCE CABLES
Filed May 18, 1942

INVENTOR.
Carl H. Bissell
BY Bodell & Thompson
ATTORNEYS.

Patented Nov. 7, 1944

2,362,184

UNITED STATES PATENT OFFICE 2,362,184

FITTING FOR SERVICE ENTRANCE CABLE

Carl H. Bissell, Syracuse, N. Y., assignor to Crouse-Hinds Company, Syracuse, N. Y., a corporation of New York Application May 18, 1942, Serial No. 443,416

2 Claims. (Cl. 174—81)

This invention relates to a fitting or cap for service entrance cable. This cable consists of one or more insulated conductors surrounded by a metallic sheath which serves as the neutral or grounded conductor of the system. This cable is at present employed exclusively for carrying the electrical service into a building. The cap or fitting is fastened to the outer wall of the building and serves to support the upper end of the cable which is connected to the power lines extending from the pole of the utility company, the cable extending downwardly along the side of the building and through the wall to the service entrance panel.

This invention has as an object a service entrance fitting of the type referred to embodying a particularly simple and economical construction consisting of a minimum number of parts and which is particularly easy to attach to the end of the cable.

The invention consists in the novel features and in the combinations and constructions hereinafter set forth and claimed.

In describing this invention, reference is had to the accompanying drawing in which like characters designate corresponding parts in all the views.

Figure 1:
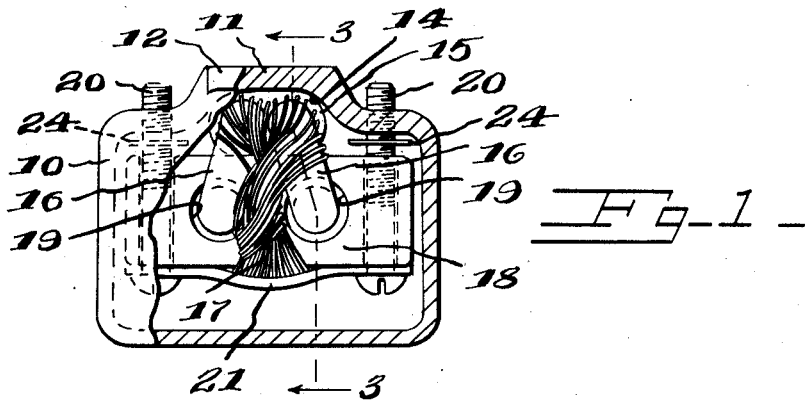
Figure 1 is a top plan view, partly in section, of a fitting embodying my invention.
Figures 2, 3:
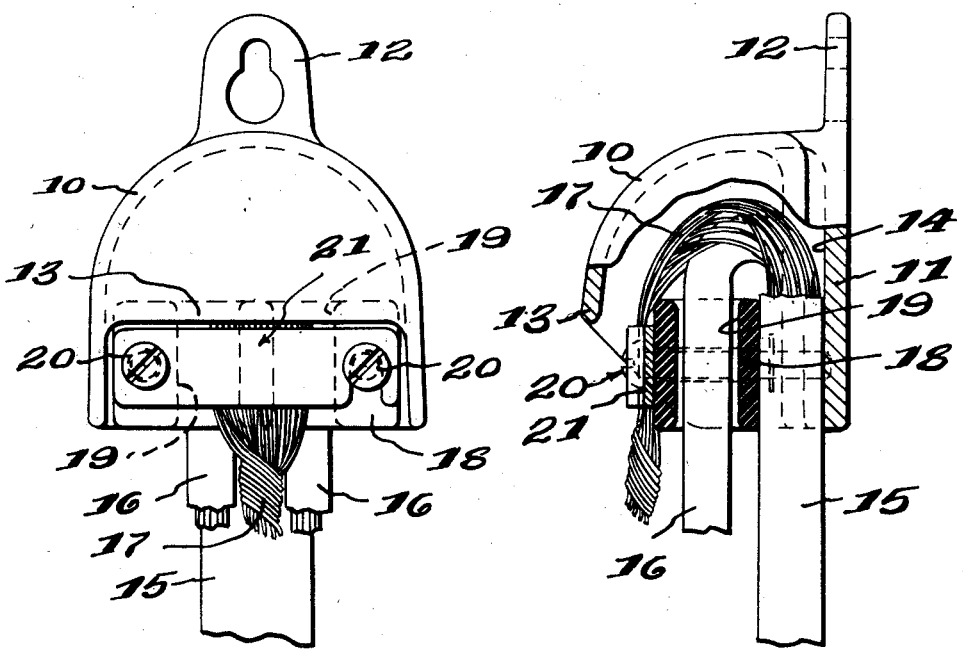
Figure 2 is a front elevational view.
Figure 3 is a side elevational view, partly in section, with the sectional part being taken substantially on line 3—3, Figure 1.

The fitting consists of a somewhat dome-shaped cap member 10. The rear wall 11 may be formed with a fastening lug 12 and the front wall terminates an appreciable distance above the lower edge of the side and rear walls, as at 13. The cap may be formed of cast metal, or may be die-cast from reinforced plastic material. The rear wall 11 is recessed rearwardly as at 14 to receive the cable 15 which is here shown as including a pair of insulated conductors 16 and an uninsulated conductor 17, the whole being conventionally covered by a metallic tape and an outer fabric braid.

The device further includes a clamping block 18 which is arranged in the cap 10 and extends transversely thereof. This block is formed with vertically arranged apertures as 19 to receive the insulated conductors 16, and with transversely extending apertures to receive clamping screws 20 which thread into the rear wall 11 of the cap member. The arrangement is such that when the screws 20 are tightened, the block 18 is moved rearwardly to clamp the cable 15 into the recess 14.

A clamping member 21 extends across the front side of the block 18. This clamping member is in the form of a metal strap provided adjacent each end with an aperture to receive the screws 20. One end of the strap may be provided with a slot in order to facilitate the manipulation of the clamp which is employed to clamp the conductor 17 to the front side of the block.

In making the installation, the outer braid and metal tape are stripped back a distance from the end of the cable exposing the conductors 16 and the uninsulated conductor 17. The block 18 is removed from the cap 10 and the conductors 16 threaded through the holes in the block, and the conductor 17 arranged under the strap 21 with the conductors 16 and the sheath extending from the block sufficiently for attachment to the power lines. The conductors are then bent to U-formation, and the block secured in the cap 10 by tightening the screws 20, which operation simultaneously clamps the fitting to the cable and the conductor 17 to the block 18. With the fitting thus secured to the end of the cable, it is attached to the side of the building by a screw extending through the lug 12. In order to prevent accidental displacement of the screws 20 from the block 18, fiber retaining washers 24 may be used on the screws 20.

What I claim is:

1. A fitting for service entrance cable comprising a metallic cap member adapted to be mounted and secured on the exterior of a building or the like, a cable clamping block of insulating material arranged in the cap, screws extending through said block and threading into the rear wall of the cap, a metal strap extending across the front side of said block and being formed with apertures to receive said screws, said block being formed with apertures extending perpendicular to said screws to receive the conductors of the cable, said screws being operable to move the clamping block against said cable to clamp the same against the rear wall of the cap, and said strap being operable to clamp one of the conductors of the cable against the front side of said block.

2. A fitting for service entrance cable comprising a metallic cap adapted to be secured to a support in inverted position, the inner surface of the rear wall of said cap being formed with a cable receiving recess, a cable clamping block of insulating material arranged in said block and being formed with horizontally extending screw receiving apertures and with vertically extending apertures to receive conductors of the cable, a metallic strap overlying the forward side of said block and having apertures complemental to the horizontal apertures in said block, screws extending through said apertures and said strap and block, and threading into the rear wall of the cap and being operable to move said block toward the rear wall of the cap and to clamp the cable in said recess, and said strap being adapted to clamp the grounding conductor of said cable against the forward side of said block.

CARL H. BISSELL.